US005652638A

United States Patent [19]
Roffman et al.

[11] Patent Number: 5,652,638
[45] Date of Patent: Jul. 29, 1997

[54] CONCENTRIC ANNULAR RING LENS DESIGNS FOR ASTIGMATISM

[75] Inventors: Jeffrey H. Roffman; Edgar V. Menezes, both of Jacksonville, Fla.

[73] Assignee: Johnson & Johnson Vision Products, Inc., Jacksonville, Fla.

[21] Appl. No.: 433,741

[22] Filed: May 4, 1995

[51] Int. Cl.$^6$ .................... G02C 7/04; G02C 7/02; A61F 2/16
[52] U.S. Cl. .................... 351/161; 351/176; 623/6
[58] Field of Search .................... 351/176, 159, 351/160 R, 160 H, 161, 168; 623/6

[56] References Cited

U.S. PATENT DOCUMENTS

| | | | |
|---|---|---|---|
| 3,623,800 | 11/1971 | Volk | 351/169 |
| 4,324,461 | 4/1982 | Salvatori | 351/161 |
| 4,580,882 | 4/1986 | Nuchman et al. | 351/176 |
| 4,932,970 | 6/1990 | Portney | 31/160 R |
| 5,016,977 | 5/1991 | Baude et al. | 351/160 R |
| 5,050,095 | 9/1991 | Samad | 395/23 |
| 5,125,729 | 6/1992 | Mercure | 351/161 |
| 5,220,359 | 6/1993 | Roffman | 351/177 |

FOREIGN PATENT DOCUMENTS

WO93/03409   2/1993   WIPO.

*Primary Examiner*—Scott J. Sugarman
*Assistant Examiner*—Jordan M. Schwartz

[57] ABSTRACT

Concentric annular ring lens designs are disclosed for astigmatic patients, particularly lens designs which reduce the sensitivity of the patient to toric axis misalignment, thus reducing the required number of stock keeping units in inventory for a toric product. Several of the concentric annular ring lens designs comprise a multifocal concentric annular ring design on either the front or back surface and a toric curve on the reverse surface to correct for astigmatism. Alternating concentric annular rings divide the optical zone of the contact lens into regions having at least two optical powers, a first optical power corresponding to the refractive spherical component of a patient's basic prescription Rx, and a second optical power corresponding to the cylindrical power of a patient's basic prescription Rx, or a portion thereof, with an optional third intermediate optical power, such that the multifocus toric lens is rotationally desensitized because of the enhanced depth-of-field provided by the plurality of concentric annular rings. Some embodiments of the present invention have a spherical front or back surface wherein the opposite surface has a plurality of toric annular rings. Some embodiments of the present invention eliminate a toric surface, prism ballast and slab-off features, and provide spherical optical powers at the basic prescription Rx spherical power, the cylindrical power prescription Rx, and an intermediate optical power intermediate to the spherical and cylindrical optical powers.

43 Claims, 6 Drawing Sheets

CONCENTRIC ANNULAR RING LENS DESIGNS FOR ASTIGMATISM

BACKGROUND OF THE INVENTION

1. Field of the Invention

The present invention relates generally to concentric annular ring lens designs for astigmatic patients, and more particularly pertains to such lens designs which reduce the sensitivity of the patient to toric axis misalignment, thus reducing the required number of stock keeping units in inventory (the total number of different prescriptions which are maintained in stock and can be prescribed) for a toric product.

The present invention provides a novel approach for correcting ametropias such as astigmatism, hyperopia and myopia, with a primary correction for astigmatism.

2. Discussion of the Prior Art

Currently, toric lenses are manufactured in the prior art with the following design features:

a. a toric curve on the front or back surface of the lens;

b. prism ballast and slab-off features on the front surface of the lens;

c. the non-toric surface is spherical.

These prior art designs correct astigmatism adequately only if the axis of the cylindrical power is accurately aligned with respect to the axis of the astigmatic cornea. A misalignment of the axes (greater than 10°) results in a substantial loss of visual acuity. The primary source of this misalignment in soft hydrogel contact lenses is poor rotational stability.

In conventional prior art toric lens designs, a single toric surface comprising a major and minor axis is placed in the optical portion of either the front or back surface of the lens. In addition, the axes of the toric lens are usually stabilized in relation to the patient's corneal axes through the use of either a prism ballasted/slab-off feature or a double slab-off feature placed on the front surface of the lens. These features tend to increase the thickness of the resultant lenses and compromise wearing comfort and physiological acceptability.

Moreover, conventional toric lens designs require a large number of stock keeping units in inventory (the total number of different prescriptions which are maintained in stock and can be prescribed) in order to fit a broad astigmatic patient base. For example, current Frequent Replacement Toric lens products are available in 800 stock keeping units per base curve in inventory (40 spherical powers×2 cylindrical powers×10 different cylindrical axis placements). Such a large number of stock keeping units per base curve in inventory is uneconomical to produce and maintain, particularly for a disposable modality product. The required large number of stock keeping units in inventory arises primarily from the need to provide 10 or more different cylindrical axes placements. Furthermore, any significant misalignment of the cylindrical axis with respect to the cylindrical axes of the eye normally results in a significant loss of visual acuity.

In an attempt to reduce the required number of cylindrical axis placements in stock keeping units, Australian Published Patent Application WO 93/03409 combines aspherical surfaces with toric surfaces to accommodate axial misalignment through the increased depth-of-focus provided by aspheres. The use of an aspheric surface enhances the depth-of-field of toric lenses and minimizes the effect of rotational misalignment of the toric lenses. Complex optics such as diffraction optics using echelets or birefringence optics are also disclosed by this published patent application. One disadvantage in using this prior art approach is the difficulty in manufacturing and controlling such complex optics and aspheres. Additionally with aspheric optics, patient anatomical variations have been shown to produce compromised visual acuity. In summary, this prior art approach is undesirable because of the high level of visual unpredictability of aspheric optics on the real world patient base, and because of the difficulty in manufacturing and controlling aspheric and other complex optics.

SUMMARY OF THE INVENTION

Accordingly, it is a primary object of the present invention to provide concentric annular ring lens designs for astigmatic patients which reduce the sensitivity of the patient to toric axis misalignment, thus reducing the required number of stock keeping units maintained in inventory for a toric product. The present invention provides toric lens designs which reduce the number of cylindrical axis placements required to fit astigmatic patients relative to conventional toric lens designs.

Some embodiments of the present invention eliminate a toric surface, prism ballast and slab-off features, and provide spherical optical powers at the basic prescription Rx spherical power, the cylindrical power prescription Rx, and an intermediate optical power between the spherical and cylindrical optical powers.

A further object of the subject invention is the provision of concentric annular ring lens designs for astigmatic patients which comprise a multifocal concentric annular ring design on either the front or back surface and a toric curve on the reverse surface to correct for astigmatism.

The present invention uses alternating concentric annular rings to divide the optical zone of a contact lens into regions having at least two optical powers, a first optical power corresponding to the refractive spherical component of a patient's basic prescription Rx, and a second optical power corresponding to the cylindrical power of a patient's basic prescription Rx, or a portion thereof.

The present invention provides enhanced and improved visual acuity for astigmatic patients by using concentric annular ring lens designs for the correction of low levels of astigmatism, and also can selectively utilize aspheric curves to enhance vision for higher amounts of astigmatism.

In accordance with the teachings herein, the present invention provides a multifocus, concentric annular ring lens for astigmatic patients wherein one of the front and back surfaces of the lens defines a toric curve, and the other surface defines a plurality of spherical concentric annular rings having at least one first spherical annular ring corresponding to the patient's basic distance spherical prescription Rx, and at least one second spherical annular ring corresponding to the patient's basic cylindrical prescription Rx, such that the multifocus toric lens is rotationally desensitized because of the enhanced depth-of-field provided by the plurality of concentric annular rings.

In greater detail, the difference between the optical powers of the first and second spherical annular rings is preferably less than 2.00 diopters. The second spherical annular ring(s) corresponds to a portion of the full cylindrical prescription Rx. The design can also incorporate third spherical annular ring(s) corresponding to an intermediate optical power which is between to the optical powers of the first and second annular rings. The concentric annular rings surround a central disc having the patient's basic spherical distance prescription Rx. Moreover, an aspheric surface can be superposed on the toric curve to enhance the depth-of-field effect of the lens. The lens can be a contact lens, such as a soft hydrogel contact lens, or an intraocular lens.

The present invention also provides a multifocus, concentric annular ring lens for astigmatic patients wherein one of the front and back surfaces defines a spherical or aspheric curve, and the other of the front and back surfaces defines a plurality of spherical concentric annular rings having at least one first spherical annular ring corresponding to the patient's basic distance prescription Rx, and at least one second spherical annular ring corresponding to the patient's cylindrical prescription Rx.

In greater detail, the second spherical annular ring(s) corresponds to a portion of the full cylindrical prescription Rx. The design can also incorporate third spherical annular ring(s) corresponding to an intermediate optical power which is between the optical powers of the first and second annular rings. The first annular ring(s) includes a central disc having the patient's basic spherical distance prescription Rx, which is encircled by at least one third intermediate power annular ring, which is encircled by at least one second cylindrical power annular ring. The concentric annular rings are preferably on the back surface of the lens, and the front surface can define an aspheric curve to enhance the depth-of-field effect of the lens.

The present invention also provides a multifocus, concentric annular ring lens for astigmatic patients wherein one of the front and back surfaces defines either a spherical or aspherical curve, and the other surface defines a plurality of respectively either aspheric or spherical concentric annular rings having at least one first annular ring corresponding to the patient's basic distance prescription Rx, and at least one second annular ring corresponding to the patient's cylindrical prescription Rx.

In greater detail, the lens has a central portion with a distance optical power, an intermediate portion with a substantially equal split of cylindrical and distance optical power, and an outer portion with increased distance optical power. The optical powers between the first and second annular rings is preferably no greater than 2.00 diopters, and the aspheric curve has an elliptical shape with a K value between −0.05 and −0.5, such that the ellipses are only slightly departed from spheres.

The present invention also provides a multifocus, concentric annular ring lens for astigmatic patients wherein one of the front and back surfaces defines a spherical surface corresponding to the patient's basic spherical distance prescription, and the other surface defines a plurality of concentric toric annular rings having at least one first toric annular ring corresponding to the patient's basic distance spherical power correction prescription Rx, and at least one second toric annular ring corresponding to the patient's basic cylindrical prescription Rx (spherical and cylindrical powers combined).

In greater detail, the second toric annular ring(s) corresponds to a portion of the full cylindrical prescription Rx. The front surface defines the spherical surface and the back surface defines the plurality of toric annular rings wherein the optical power difference between the first and second alternating concentric toric annular rings is no greater than 2.00 D, which provides a sufficient depth-of-focus effect to allow an axial misalignment of up to + or −20 degrees from the reference axial position.

BRIEF DESCRIPTION OF THE DRAWINGS

The foregoing objects and advantages of the present invention for concentric annular ring lens designs for astigmatism may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
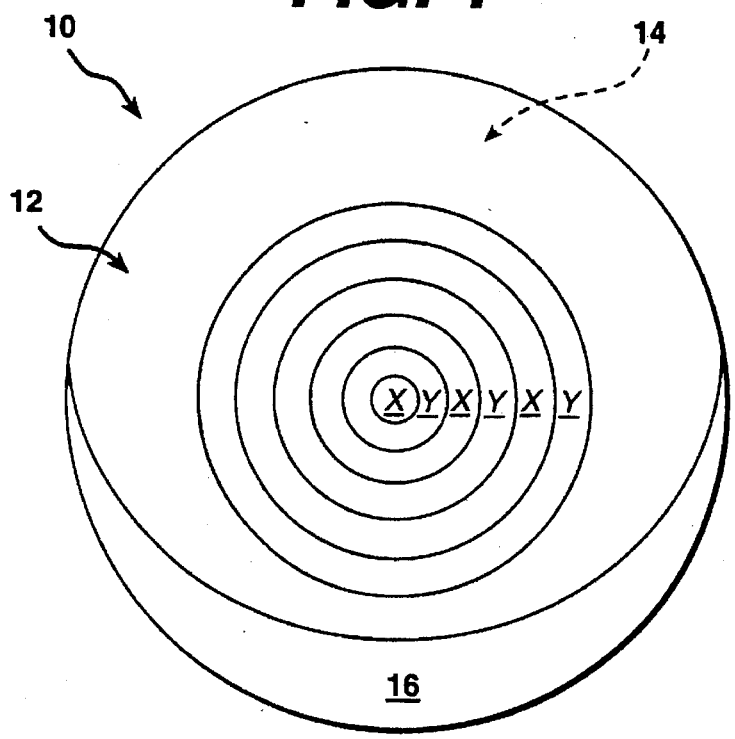
FIGS. 1 and 2 illustrate respectively front plan and side views of a first embodiment of a concentric annular ring lens designed pursuant to the teachings of the present invention which comprises a concentric annular ring spherical front surface having first and second optical powers X and Y and a toric back surface.
Figure 2:
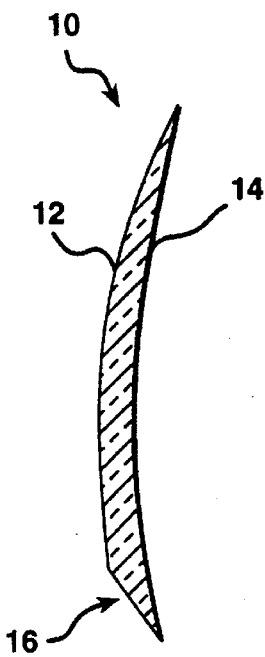

FIGS. 1 and 2 illustrate respectively front plan and side views of a first embodiment of a concentric annular ring lens 10 designed pursuant to the teachings of the present invention which comprises:

a. a concentric annular ring spherical front surface 12;
b. a toric back surface 14;
c. prism ballast and slab-off features 16 on the front surface.

In principle, the two optical spherical powers X and Y of the alternating front surface concentric annular rings X and Y can include first concentric annular rings having a spherical power corresponding to the patient's basic distance prescription Rx, and second spherical annular rings corresponding to the patient's cylindrical prescription Rx, which may correspond to a portion of the patient's cylindrical prescription. The resultant toric lens is rotationally desensitized in the same manner as if the front surface were aspheric with a depth-of-field effect as disclosed in Published Patent Application WO 93/03409.

Figure 3:
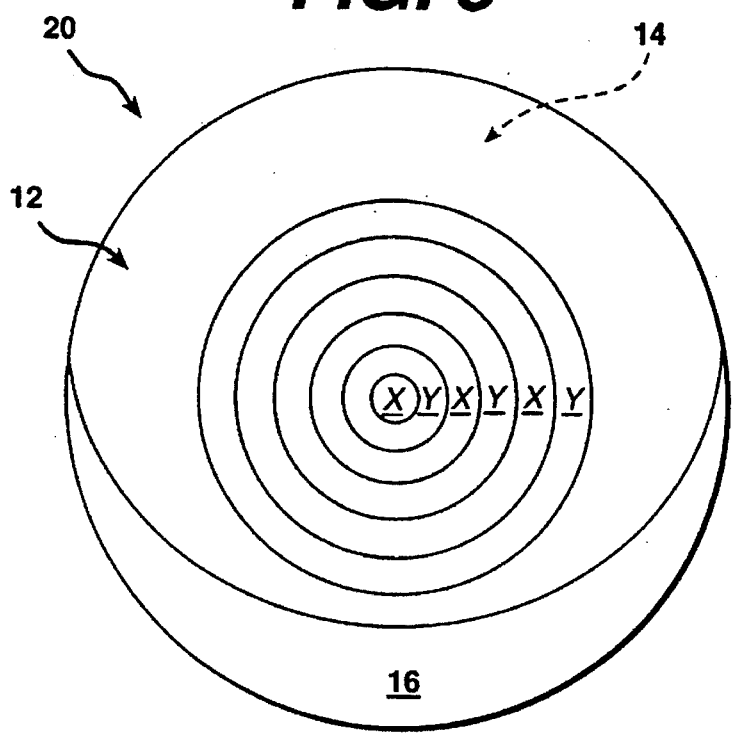
FIGS. 3 and 4 illustrate respectively front plan and side views of a second embodiment of a concentric annular ring lens similar to the lens of FIGS. 1 and 2 which includes intermediate spherical optical power rings I in the lens design in addition to the first and second optical spherical powers X and Y.
Figure 4:
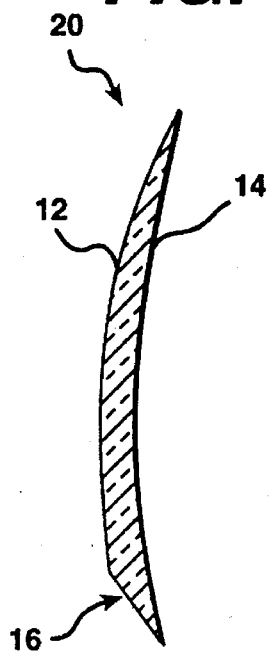

FIGS. 3 and 4 illustrate respectively front plan and side views of a second embodiment of a concentric annular ring lens 20 pursuant to the present invention similar to the first embodiment 10 wherein, in addition to the two optical spherical powers X and Y, intermediate spherical optical power rings I are also included in the lens design.

The following example is illustrative of the principles of operation of the present invention in the embodiments of FIGS. 1-4.

For a patient with a prescription Rx of $-3.00/-1.50 \times 180$ (wherein $-3.00$ D is the patient's basic distance optical power correction, $-1.50$ D is the patient's basic cylindrical optical power correction, with the cylindrical axis specified at 180°), the power on the 90°–270° axis is $-4.50$ D (which is the sum of $-3.00$ D and the full cylindrical $-1.50$ D available on this axis) whereas the power on the 0°–180° axis is $-3.00$ D (the cylindrical surface contributes nothing on this axis).

For the first embodiment, the following are spherical optical power values for x and y:

$x = -3.00$ D, $y = -4.50$ D

For the second embodiment, $x = -3.00$ D, $y = -4.50$ D and $I = 3.75$ D

For most patients, visual acuity is acceptable even if the refractive lens is off by 0.5 D from the measured refractive power. Therefore, in the above example, the effective ranges of the spherical optical powers are:

In the first embodiment:

$-2.50 \text{ D} \leq x \leq -3.50 \text{ D}; -4.00 \text{ D} \leq y \leq -5.00 \text{ D}.$ In the second embodiment:

$-2.50 \text{ D} \leq x \leq -3.50 \text{ D}; -4.00 \text{ D} \leq y \leq -5.00 \text{ D}; -3.25 \text{ D} \leq I \leq -4.25 \text{ D}.$ It is recognized in the prior art that a patient's brain has the accommodative capability of accepting an in-focus image while disregarding out-of-focus images. Recognizing a patient's basic accommodative capabilities, the above prescriptions should provide acceptable visual acuity notwithstanding some (10°–20°) misalignment of the axis of the toric lens.

It is known that for astigmatic subjects, an astigmatic eye will form an image which contains three main regions:

1. the spherical power will focus as a line;
2. the cylindrical power will also focus as a line, perpendicular to the spherical image line.
3. a circular image will focus in between the two focal lines known as the "circle of least confusion", which is at an intermediate optical power intermediate to the spherical and cylindrical optical powers.

Figure 5:
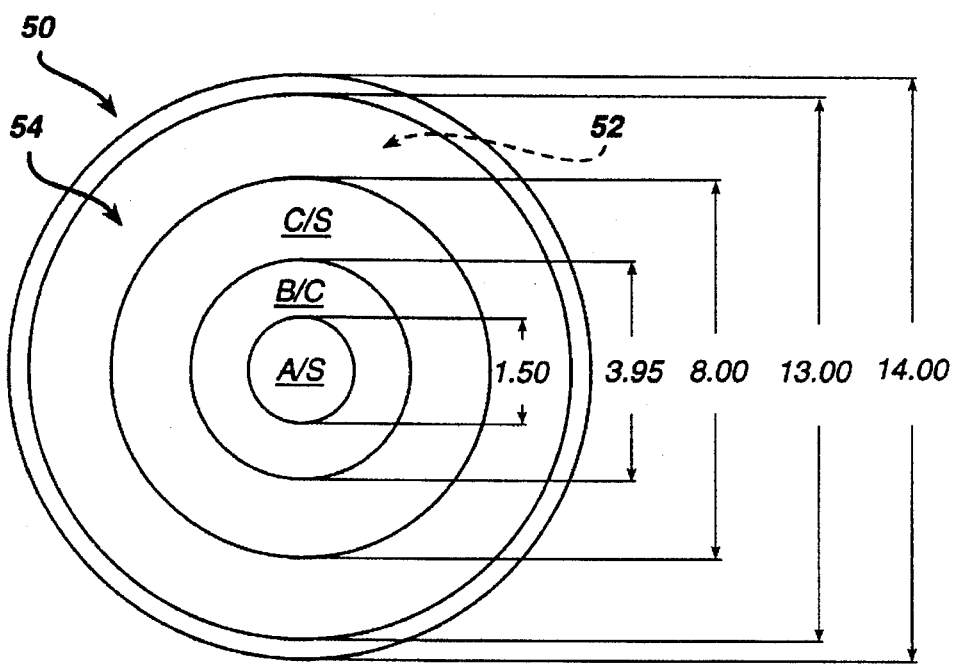
FIG. 5 illustrates a plan view of the back surface of a third embodiment of a concentric annular ring lens pursuant to the present invention which eliminates the toric surface and utilizes a spherical or aspheric surface on one side of the lens, combined with a multifocal, concentric spherical annular ring surface on the opposite side of the lens.

FIG. 5 illustrates a plan view of the back surface of a third embodiment of a concentric annular ring lens 50 pursuant to the present invention which eliminates the toric surface and also the prism ballast and slab-off features, and utilizes a spherical or aspheric surface 52 on one side of the lens 50, preferably the front surface although the back surface can be used in alternative embodiments, combined with a multifocal, concentric spherical annular ring surface 54 on the opposite side of the lens, preferably the back surface although the front surface can be used in alternative embodiments.

In this embodiment, the concentric annular rings in the optic zone of the lens provide at least three different optical powers:

A-the basic prescription spherical optical power for distance which exists along the cylindrical axis;

B-the prescription cylindrical optical power (spherical and cylindrical powers combined);

C-an intermediate optical power based upon the best focal point or circle of least confusion of a toric surface. This embodiment utilizes the principle of fitting the spherical equivalent optical power, along with the spherical and cylindrical optical powers.

Several embodiments of the present invention achieve an increased depth-of-focus effect without the use of aspheric surfaces and their attendant complexities and disadvantages. Instead of aspheres, concentric spheres or toric surfaces of small power difference between alternating zones are utilized to provide an increased depth-of-focus effect.

Figure 6:
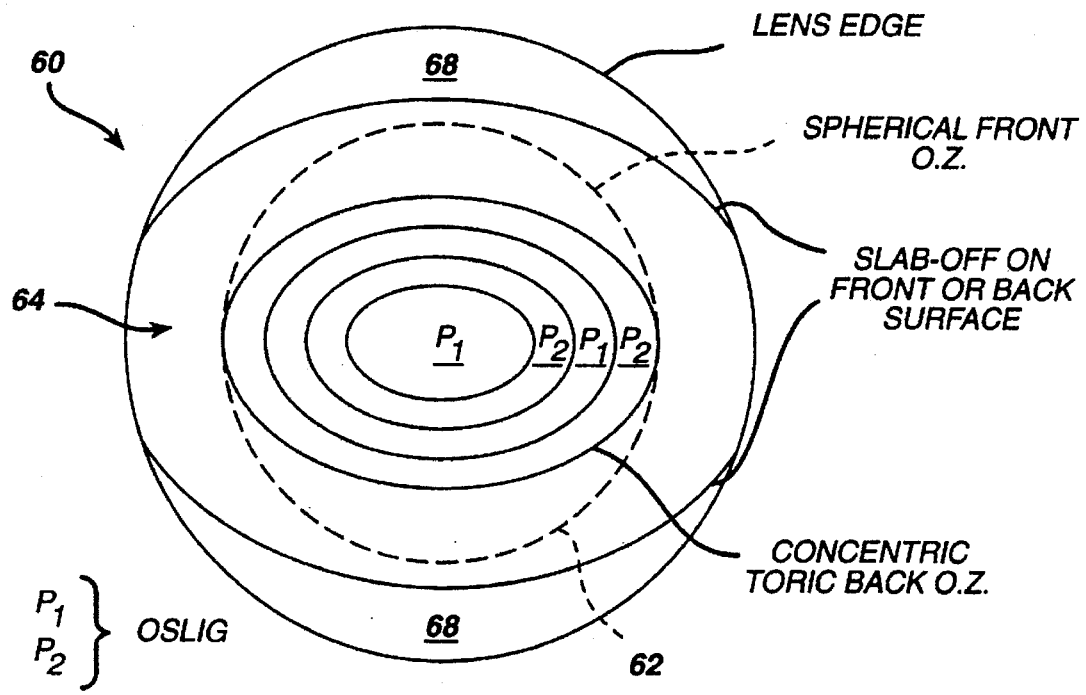
FIG. 6 illustrates a plan view of the back surface of a further embodiment of a lens design which comprises a spherical front surface corresponding to the patient's basic spherical distance prescription, and a toric back surface consisting of concentric toric annular ring surfaces.

FIG. 6 illustrates a plan view of the back surface of a further embodiment of a lens design 60 which comprises a spherical front surface 62 corresponding to the patient's basic spherical distance prescription, a toric back surface 64 consisting of concentric annular ring toric surfaces 66, having alternating optical powers P1 and P2, and a double slab-off feature 68 to stabilize the lens in either a 90° or 180° axis position. The alternating concentric annular rings correspond to the patient's prescription Rx, and include first annular rings of power P1 corresponding to the patient's distance prescription Rx and second annular rings of a power P2 corresponding to the patient's cylindrical prescription Rx, preferably a portion thereof. The optical power difference between the alternating concentric annular toric rings P1 and P2 is no greater than 2.00 D. This small power difference provides a sufficient depth-of-focus effect to allow an axis misalignment of up to + or −20 degrees from a reference such as either the 90° or 180° position.

Figure 7:
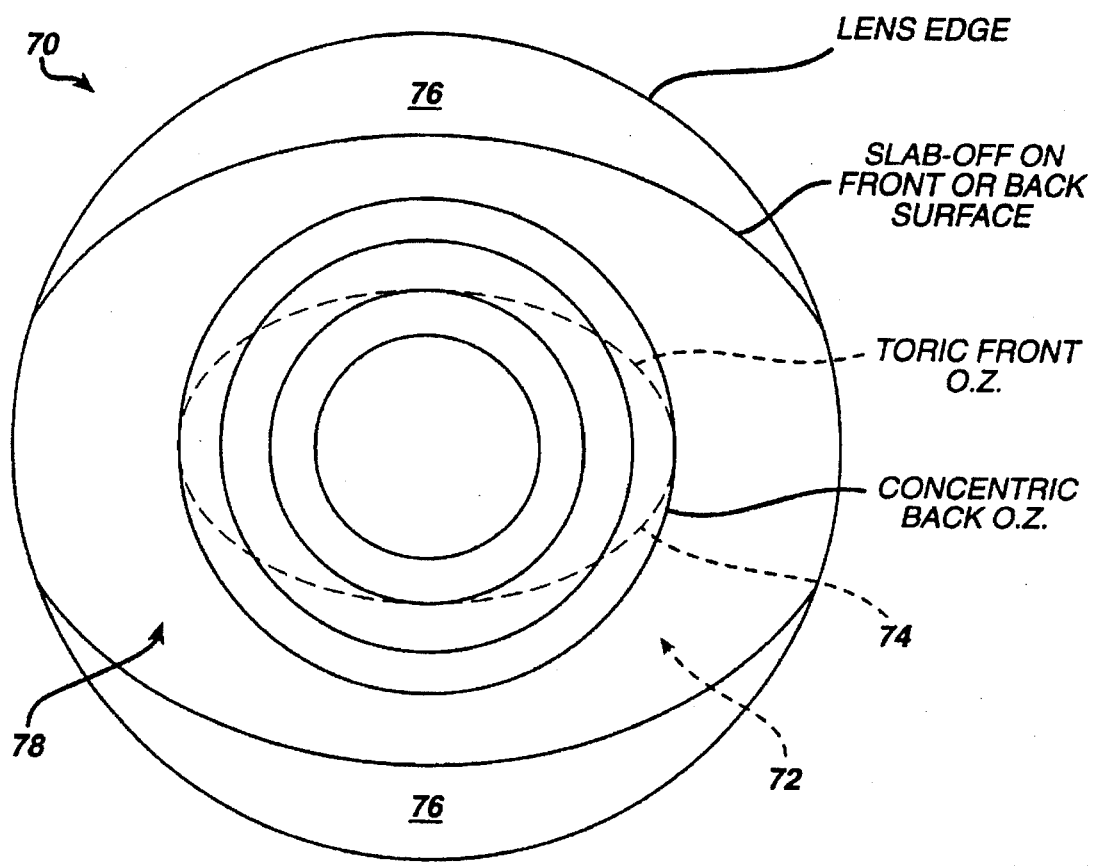
FIG. 7 illustrates a preferred embodiment of the present invention wherein the front surface of the lens comprises a simple toric curve in the optic zone, and the back surface of the lens comprises multiple alternating concentric spherical annular rings.

FIG. 7 illustrates a further preferred embodiment of the present invention wherein the front surface 72 of the lens 70 comprises a simple toric optic zone 74 stabilized by a double slab-off feature 76 in the 90° and/or 180° position, and the back surface 78 of the lens comprises multiple alternating concentric spherical annular rings. The alternating concentric annular rings correspond to the patient's prescription Rx, and include first annular rings of power P1 corresponding to the patient's distance prescription Rx and second annular rings of a power P2 corresponding to the patient's cylindrical prescription Rx, preferably a portion thereof. Again, the power difference of the alternating concentric spherical annular rings of the back surface is no greater than 2.00 D, which allows an axis misalignment of up to + or −20 degrees from the reference prescription position.

In either of the previous two embodiments, the number of stock keeping units per base curve maintained in inventory is reduced to 160 (40 spherical powers×2 cylindrical powers×2 axes −90°, 180°). Furthermore, the depth-of-focus effect provided by the concentric annular ring lenses allows for axial misalignments without significant loss of visual acuity.

Several embodiments of the present invention function by alternating spherical power with cylindrical power to provide adequate levels of both powers to the retina of the eye. The actual cylindrical power can be the full cylindrical power or any fraction thereof, ranging from 25% to 100% of the full refractive cylindrical power.

In some preferred embodiments, the concentric annular ring structures are placed on the back of the contact lens, with the basic spherical distance power in a disc at the center thereof.

The following TABLE I illustrates several proposed pupil functionalities for this type of multifocal annular ring lens design wherein each zone can include a plurality of annular rings. The subject's pupil is divided into three zones, and the innermost zone is preferred as spherical.

TABLE I

| | Preferred Pupil Functions | |
|---|---|---|
| Inner Zone | Mid Zone | Outer Zone |
| Type A: Sphere | Equal (50/50 split) | Sphere |
| Type B: Sphere | Equal | Cylindrical |
| Type C: Sphere | Equal | Equal |
| Type D: Sphere | Cylindrical | Sphere |
| Type E: Sphere | Cylindrical | Equal |

In this table, cylindrical means a spherical optical power corresponding to the cylindrical prescription (spherical plus cylindrical powers), or a portion thereof.

Figure 8:
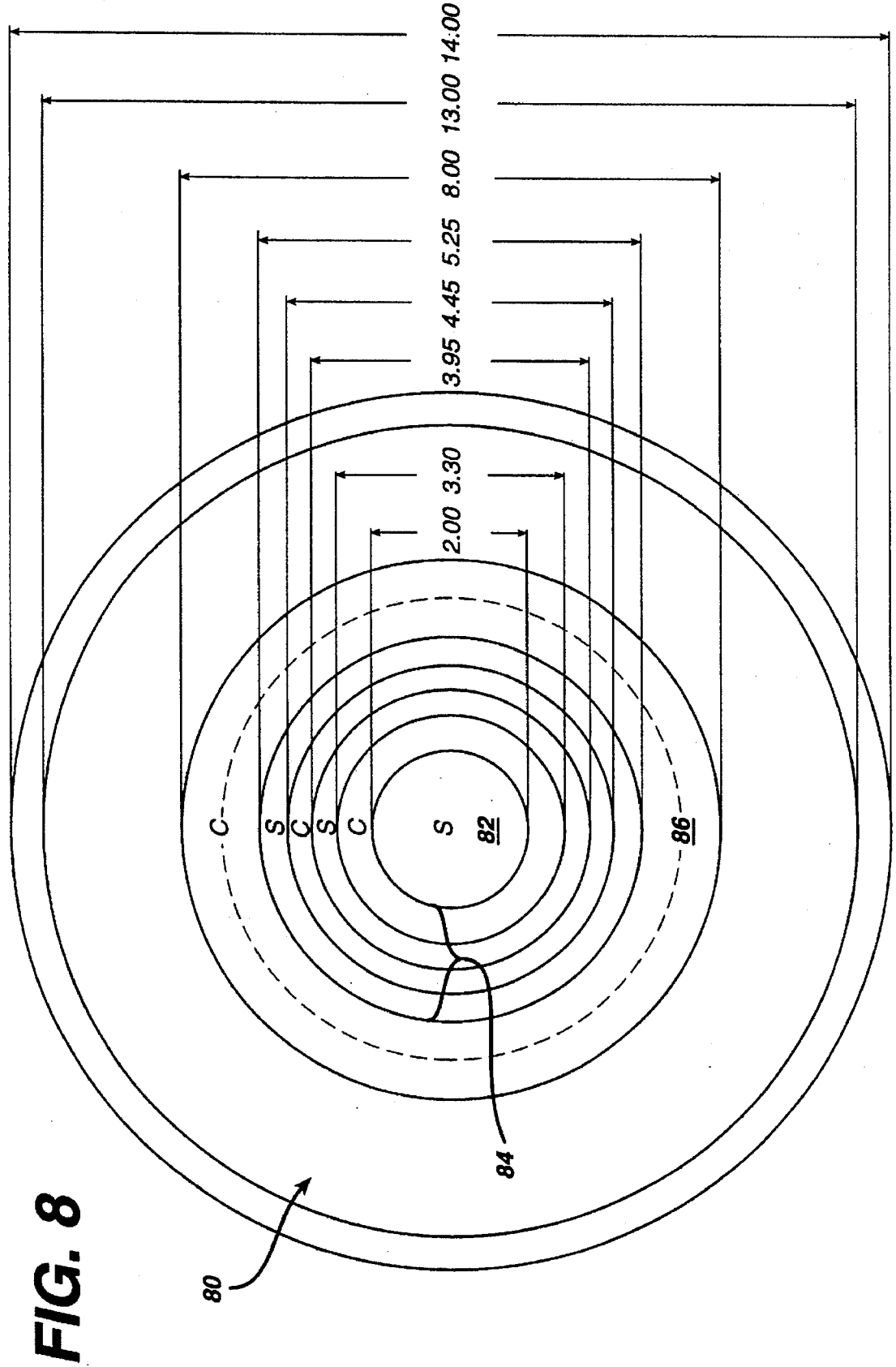
FIG. 8 is a plan view of a preferred embodiment of a lens design wherein the optic zone of the lens is divided into three zones, an innermost zone which is a spherical disc having the patient's basic distance prescription Rx, a middle zone consisting of one or more annular rings having spherical and cylindrical optical powers, an outer zone consisting of one or more annular rings having predominantly cylindrical optical powers.
Figure 9:
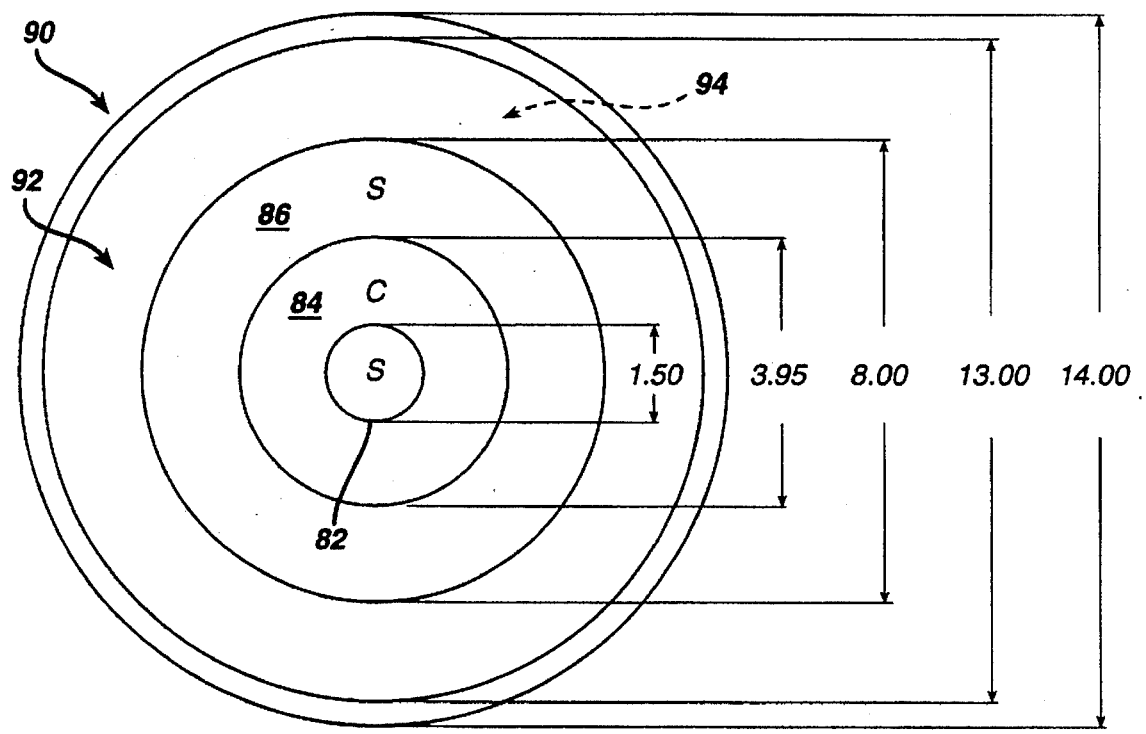
FIG. 9 is a plan view of the back surface of an exemplary embodiment of a lens having a concentric multifocal either spherical or aspheric annular ring back surface with respectively either an aspheric or aspherical front surface.
Figure 10:
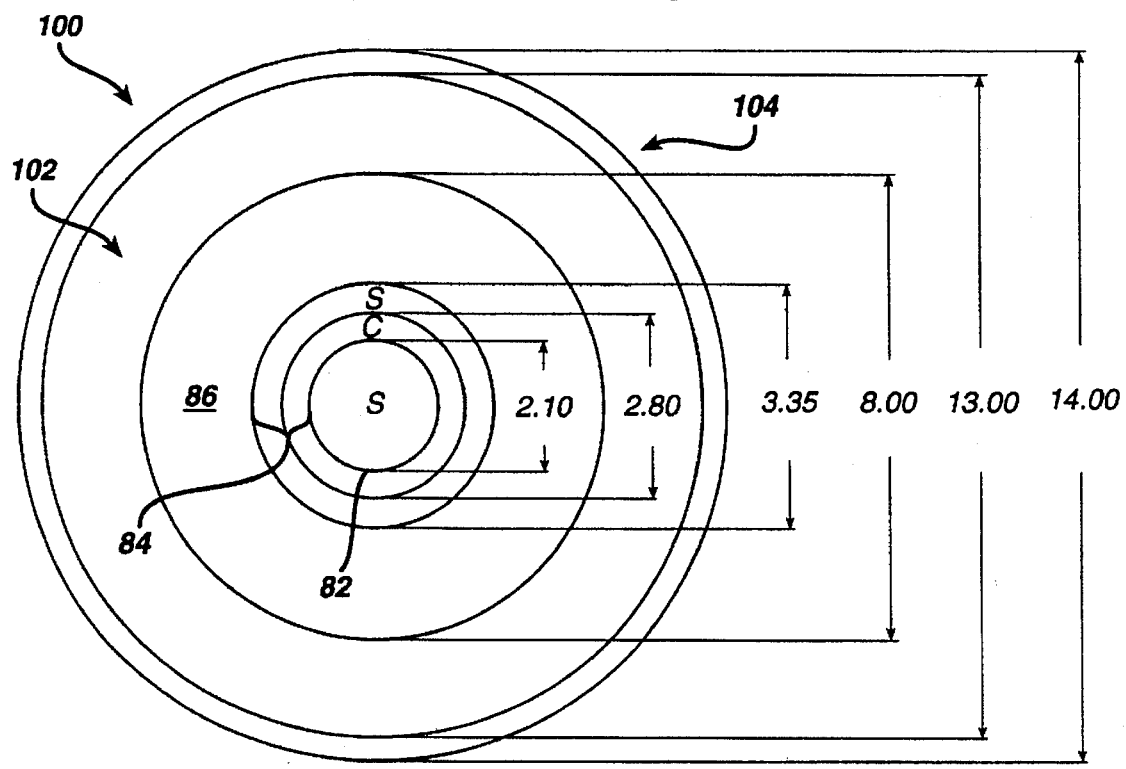
FIG. 10 is a plan view of the front surface of an exemplary embodiment of a lens having a concentric multifocal either spherical or aspheric annular ring front surface with respectively either an aspheric or a spherical back surface.

FIG. 8 is a plan view of this type of lens design 80 wherein the optic zone of the lens, which corresponds to a pupil contracted or enlarged under various illumination conditions, is divided into three zones, an innermost zone 82, a middle zone 84, an outer zone 86, which are also illustrated in the embodiments of FIGS. 9 and 10. The innermost zone 82 is a spherical disc having the patient's basic distance prescription Rx. The middle zone 84 consists of one or more annular rings pursuant to the above table, and the outer zone 86 also consists of one or more annular rings pursuant to the table. FIG. 8 illustrates one exemplary designed embodiment of a lens design 100 of type B in the table pursuant to the present invention having: an inner spherical zone S, surrounded by an intermediate zone having respective annular rings CSCS, surrounded by an outer zone having only cylindrical power, with a distance curve radius of 8.4 mm; a near curve radius of 8.51173 mm; an intermediate curve radius of 8.39209 mm; and a peripheral curve radius of 9.832 mm.

The present invention relates to concentric annular ring lens designs for the correction of astigmatism which provide enhanced and improved visual acuity. Several of these lens designs have been clinically evaluated on an experimental basis and have been found to be effective in most cases up to cylindrical powers of −1.50 DC, with some positive effect up to −2.00 DC. The effectiveness of these lens designs can also be enhanced in the range from −1.50 DC to −2.00 DC by combining those concentric annular ring lens designs with aspheric optical surfaces.

TABLE II

| Design Types | |
|---|---|
| Front Surface | Back Surface |
| Asphere | Concentric; spherical rings |
| Sphere | Concentric; aspherical rings |
| Concentric; spherical rings | Asphere |
| Concentric; aspherical rings | Sphere |

FIG. 9 is a plan view of the back surface of an exemplary embodiment of a lens 90, as listed in Table II, having either a concentric multifocal spherical or aspheric annular ring back surface 92 with respectively either an aspheric or aspherical front surface 94.

FIG. 10 is a plan view of the front surface of an exemplary embodiment of a lens 100, as listed in Table II, having either a concentric multifocal spherical or aspheric annular ring front surface 102 with respectively either an aspheric or a spherical back surface 104.

Previous embodiments herein divide the optic zone of the lens (corresponding to different pupil sizes) into discrete concentric zones with alternating spherical distance and cylindrical optical powers. The arrangement of those power zones could be disposed to provide an optimal split between spherical and cylindrical optical powers, obtained when the central portion of the lens has distance optical power, the intermediate sized pupils have a near equal split and the largest of pupil sizes having an increased distance optical power.

Aspheric surfaces can be described by the following general equation which is a general conic equation which describes all conics, including spheres, parabolas, ellipses and hyperbola:

$$y = \frac{x^2}{r + \sqrt{r^2 - (k+1)x^2}}$$

where
 $k=0$ for a sphere,
 $k=-1$ for a parabola,
 $0 > k > -1$ for an ellipse,
 $k < -1$ for a hyperbola.

A lens with a front surface having an asphere combined with a rear surface having concentric annular spherical rings is a preferred embodiment as it is easy to design and implement. Most of the power difference correction for astigmatism is accomplished by the concentric annular ring lens design, and accordingly an asphere providing only a slight boost is required to improve visual acuity. In order to achieve this, a small aspheric k value is required. The k value is less than that required to reduce the blur circle (circle of least confusion) diameter for both spherical and cylindrical powers on their own. An optimal form is an elliptical shape, with a K value between −0.05 and −0.5. Thus, the ellipses used herein are only slightly departed from spheres.

In the case of aspheric rings, either the spherical or the cylindrical rings or both may be aspherized. In that case, the K values also remain between −0.05 to −0.5.

The present invention can also replace the discrete concentric annular bands with a smooth aspheric function. Aspheric in this sense can indicate a conic asphere, a conic asphere with varying eccentricity, or a polynomial function which simulates the functional discrete power split.

Figure 11:
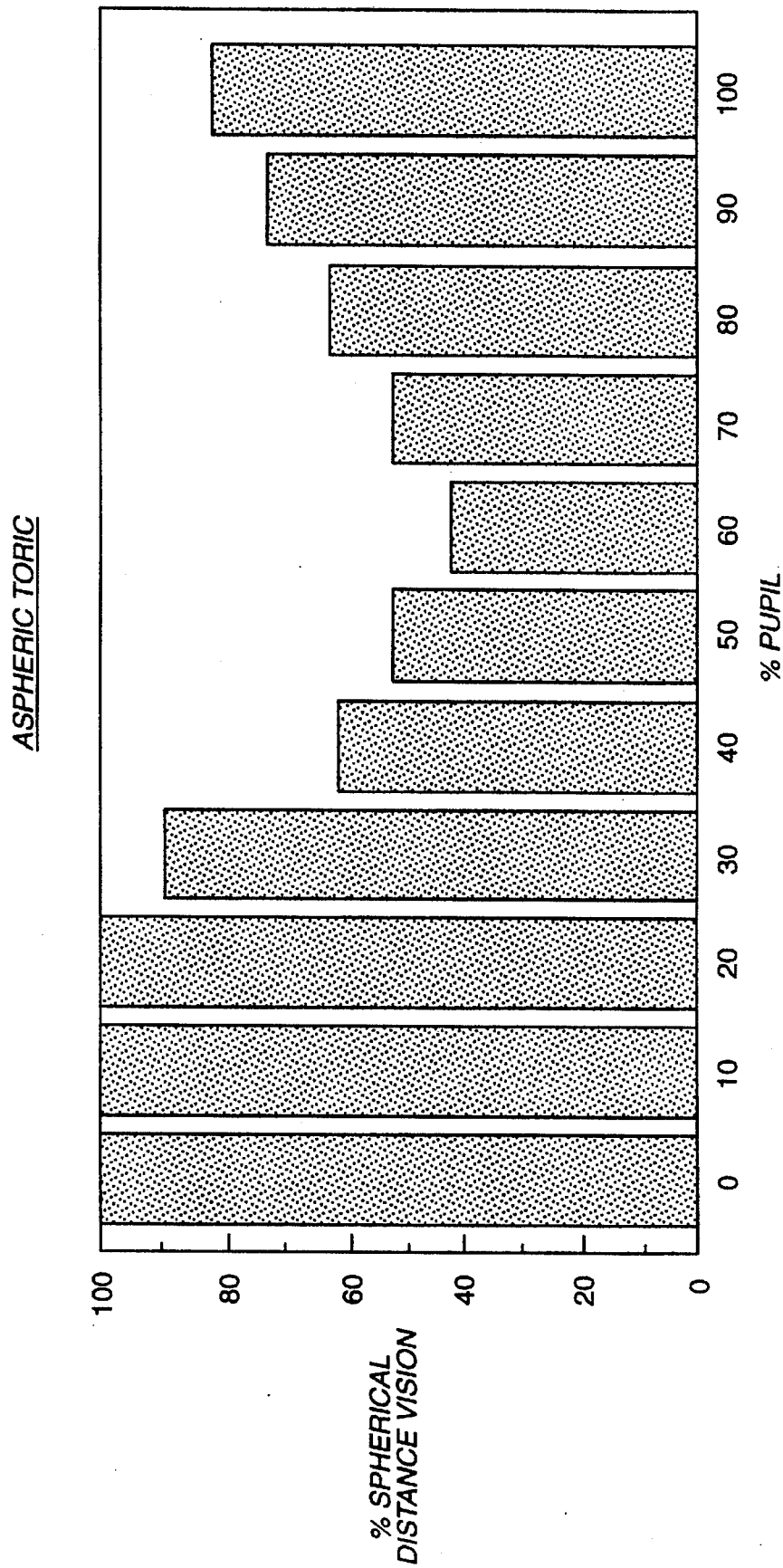
FIG. 11 shows a typical power profile for aspheric multifocal lenses, and illustrates a graph of % spherical vision as a function of % pupil, wherein the larger percentages of the pupil correspond to larger radial distances of the optic zone of the lens.

FIG. 11 shows a typical power profile as derived by such an aspheric surface, which could be on either the front or back surface of the lens. FIG. 11 illustrates a graph for aspheric multifocal lenses of % sphere distance vision as a function of % pupil, wherein the larger percentages of pupil correspond to larger radial distances up to a radius defining the outer circumference of the optic zone of the lens.

While several embodiments and variations of the present invention for concentric lens designs for astigmatism are described in detail herein, it should be apparent that the disclosure and teachings of the present invention will suggest many alternative designs to those skilled in the art.

What is claimed is:

1. A multifocus, concentric annular ring lens for astigmatic patients comprising:
   a. said lens having a front surface and an opposite back surface;
   b. one of the front and back surfaces defines a toric curve;
   c. the other of the front and back surfaces defines a plurality of spherical concentric annular rings having at least one first spherical annular ring corresponding to the patient's basic distance spherical prescription Rx, and at least one second spherical annular ring corresponding to the patient's basic cylindrical prescription Rx, such that the multifocus toric lens is rotationally desensitized because of the enhanced depth-of-field provided by the plurality of concentric annular rings; wherein the difference between the optical powers of the first and second spherical annular rings is less than 2.0 diopters.

2. A multifocus, concentric annular ring lens for astigmatic patients as claimed in claim 1, wherein the at least one second spherical annular ring corresponds to a portion of the full cylindrical prescription Rx.

3. A multifocus, concentric annular ring lens for astigmatic patients as claimed in claim 1, further including at least one third spherical annular ring corresponding to an intermediate optical power which is between the optical powers of the first and second annular rings.

4. A multifocus, concentric annular ring lens for astigmatic patients as claimed in claim 1, wherein the concentric annular rings surround a central disc having the patient's basic spherical distance prescription Rx.

5. A multifocus, concentric annular ring lens for astigmatic patients as claimed in claim 1, wherein the concentric annular rings are on the back surface of the lens.

6. A multifocus, concentric annular ring lens for astigmatic patients as claimed in claim 1, wherein the lens is a contact lens.

7. A multifocus, concentric annular ring lens for astigmatic patients as claimed in claim 1, wherein the lens is an intraocular lens.

8. A multifocus, concentric annular ring lens for astigmatic patients as claimed in claim 1, wherein the lens is an intraocular lens.

9. A multifocus, concentric annular ring lens for astigmatic patients comprising:
   a. said lens having a front surface and an opposite back surface;
   b. one of the front and back surfaces defines a toric curve;
   c. the other of the front and back surfaces defines a plurality of spherical concentric annular rings having at least one first spherical annular ring corresponding to the patient's basic distance spherical prescription Rx, and at least one second spherical annular ring corresponding to the patient's basic cylindrical prescription Rx, such that the multifocus toric lens is rotationally desensitized because of the enhanced depth-of-field provided by the plurality of concentric annular rings; and
   d. said lens further including an aspheric surface superposed on the toric curve to enhance the depth-of-field effect of the lens.

10. A multifocus, concentric annular ring lens for astigmatic patients comprising:
    a. said lens having a front surface and an opposite back surface;
    b. one of the front and back surfaces defines a spherical or aspheric curve;
    c. the other of the front and back surfaces defines a plurality of spherical concentric annular rings having at least one first spherical annular ring corresponding to the patient's basic distance prescription Rx, and at least one second spherical annular ring corresponding to the patient's cylindrical prescription Rx; and
    d. at least one third spherical annular ring corresponding to an intermediate optical power which is between the optical powers of the first and second annular rings.

11. A multifocus, concentric annular ring lens for astigmatic patients comprising:
    a. said lens having a front surface and an opposite back surface;
    b. one of the front and back surfaces defines a spherical or aspheric curve;
    c. the other of the front and back surfaces defines a plurality of spherical concentric annular rings having at least one first spherical annular ring corresponding to the patient's basic distance prescription Rx, and at least one second spherical annular ring corresponding to the patient's cylindrical prescription Rx; and
    wherein the difference between the optical powers of the first and second spherical annular rings is less than 2.0 diopters.

12. A multifocus, concentric annular ring lens for astigmatic patients as claimed in claim 11, wherein the at least one second spherical annular ring corresponds to a portion of the full cylindrical prescription Rx.

13. A multifocus, concentric annular ring lens for astigmatic patients as claimed in claim 11, wherein the at least one first annular ring includes a central disc having the patient's basic spherical distance prescription Rx, at least one third annular ring encircles the central disc, and the at least one second annular ring encircles the third annular ring.

14. A multifocus, concentric annular ring lens for astigmatic patients as claimed in claim 11, wherein the concentric annular rings are on the back surface of the lens.

15. A multifocus, concentric annular ring lens for astigmatic patients as claimed in claim 11, wherein the one surface defines an aspheric curve to enhance the depth-of-field effect of the lens.

16. A multifocus, concentric annular ring lens for astigmatic patients as claimed in claim 11, wherein the lens is a contact lens.

17. A multifocus, concentric annular ring lens for astigmatic patients as claimed in claim 16, wherein the lens is a soft hydrogel contact lens.

18. A multifocus, concentric annular ring lens for astigmatic patients comprising:
    a. said lens having a front surface and an opposite back surface;
    b. one of the front and back surfaces defines a spherical curve;
    c. the other of the front and back surfaces defines a plurality of aspheric concentric annular rings having at least one first aspheric annular ring corresponding to the patient's basic distance prescription Rx, and at least one second aspheric annular ring corresponding to the patient's cylindrical prescription Rx;

wherein the difference between optical powers of the first and second annular rings is no greater than 2.00 diopters.

19. A multifocus, concentric annular ring lens for astigmatic patients as claimed in claim 18 wherein the lens has a central portion with a distance optical power, an intermediate portion with a substantially equal split of cylindrical and distance optical power, and an outer portion with distance optical power greater than that of the central portion.

20. A multifocus, concentric annular ring lens for astigmatic patients as claimed in claim 18, wherein the spherical curve is on the front surface.

21. A multifocus, concentric annular ring lens for astigmatic patients as claimed in claim 20, wherein each aspheric annular ring has an elliptical shape with a k value between −0.05 and −0.5, such that the ellipses are only slightly departed from spheres.

22. A multifocus, concentric annular ring lens for astigmatic patients as claimed in claim 18, wherein the at least one second annular ring corresponds to a portion of the full cylindrical prescription Rx.

23. A multifocus, concentric annular ring lens for astigmatic patients as claimed in claim 18, wherein the concentric annular rings surround a central disc having the patient's basic spherical distance prescription Rx.

24. A multifocus, concentric annular ring lens for astigmatic patients as claimed in claim 18, wherein the lens is a contact lens.

25. A multifocus, concentric annular ring lens for astigmatic patients as claimed in claim 24, wherein the contact lens is a soft hydrogel contact lens.

26. A multifocus, concentric annular ring lens for astigmatic patients as claimed in claim 18, wherein the lens is an intraocular lens.

27. A multifocus, concentric annular ring lens for astigmatic patients comprising:
  a. said lens having a front surface and an opposite back surface;
  b. one of the front and back surfaces defines an aspheric curve;
  c. the other of the front and back surfaces defines a plurality of spherical concentric annular rings having at least one first spherical annular ring corresponding to the patient's basic distance prescription Rx, and at least one second spherical annular ring corresponding to the patient's cylindrical prescription Rx;

wherein the difference between optical powers of the first and second annular rings is no greater than 2.00 diopters.

28. A multifocus, concentric annular ring lens for astigmatic patients as claimed in claim 27, wherein the lens has a central portion with a distance optical power, an intermediate portion with a substantially equal split of cylindrical and distance optical power, and an outer portion with distance optical power greater than that of the central portion.

29. A multifocus, concentric annular ring lens for astigmatic patients as claimed in claim 27, wherein the aspheric curve is on the front surface.

30. A multifocus, concentric annular ring lens for astigmatic patients as claimed in claim 27, wherein the at least one second annular ring corresponds to a portion of the full cylindrical prescription Rx.

31. A multifocus, concentric annular ring lens for astigmatic patients as claimed in claim 27, wherein the concentric annular rings surround a central disc having the patient's basic spherical distance prescription Rx.

32. A multifocus, concentric annular ring lens for astigmatic patients as claimed in claim 27, wherein the lens is a contact lens.

33. A multifocus, concentric annular ring lens for astigmatic patients as claimed in claim 32, wherein the contact lens is a soft hydrogel contact lens.

34. A multifocus, concentric annular ring lens for astigmatic patients as claimed in claim 27, wherein the lens is an intraocular lens.

35. A multifocus, concentric annular ring lens for astigmatic patients comprising:
  a. said lens having a front surface and an opposite back surface;
  b. one of the front and back surfaces defines a spherical surface corresponding to the patient's basic spherical distance prescription;
  c. the other of the front and back surfaces defines a plurality of concentric toric annular rings having at least one first toric annular ring corresponding to the patient's basic spherical correction prescription Rx, and at least one second toric annular ring corresponding to the patient's basic cylindrical prescription Rx.

36. A multifocus, concentric annular ring lens for astigmatic patients as claimed in claim 35, wherein the optical power difference between the first and second concentric toric annular rings is no greater than 2.00 D, which provides a sufficient depth-of-focus effect to allow an axial misalignment of up to + or −20 degrees from the reference axial position.

37. A multifocus, concentric annular ring lens for astigmatic patients as claimed in claim 36, wherein the at least one second toric annular ring corresponds to a portion of the full cylindrical prescription Rx.

38. A multifocus, concentric annular ring lens for astigmatic patients as claimed in claim 35, wherein the front surface defines the spherical surface and the back surface defines the plurality of toric annular rings.

39. A multifocus, concentric annular ring lens for astigmatic patients as claimed in claim 35, wherein the at least one second toric annular ring corresponds to a portion of the full cylindrical prescription Rx.

40. A multifocus, concentric annular ring lens for astigmatic patients as claimed in claim 35, wherein the concentric annular rings surround a central disc having the patient's basic spherical distance prescription Rx.

41. A multifocus, concentric annular ring lens for astigmatic patients as claimed in claim 35, wherein the optical power difference between the first and second annular rings is no greater than 2.00 diopters.

42. A multifocus, concentric annular ring lens for astigmatic patients as claimed in claim 35, wherein each toric annular ring has an aspheric curve having an elliptical shape with a K value between −0.05 and −0.5, such that the ellipses are only slightly departed from spheres.

43. A multifocus, concentric annular ring lens for astigmatic patients as claimed in claim 35, wherein the lens is a contact lens.

* * * * *

UNITED STATES PATENT AND TRADEMARK OFFICE
CERTIFICATE OF CORRECTION

PATENT NO.   : 5,652,638
DATED        : July 29, 1997
INVENTOR(S)  : Jeffrey H. Roffman; Edgar V. Menezes It is certified that error appears in the above-indentified patent and that said Letters Patent is hereby corrected as shown below:

Replace Figure 3 with the corrected Figure 3 as follows:

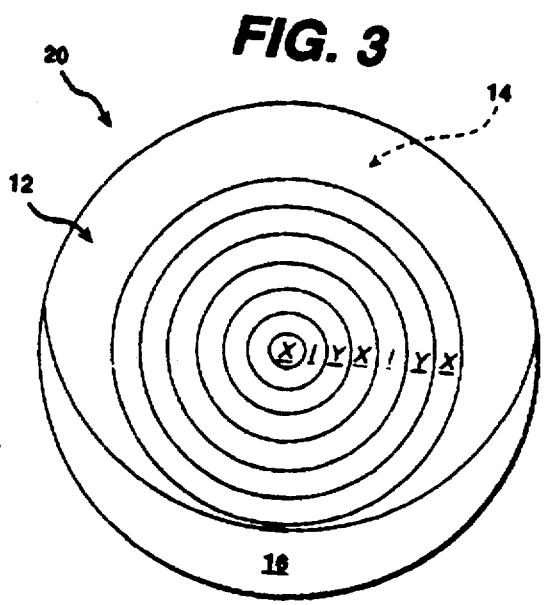

FIG. 3

Signed and Sealed this

Sixteenth Day of June, 1998

Attest:

BRUCE LEHMAN

*Attesting Officer*      *Commissioner of Patents and Trademarks*